United States Patent
Cattoor et al.

(10) Patent No.: US 12,071,004 B2
(45) Date of Patent: Aug. 27, 2024

(54) TRANSMISSION ASSEMBLY

(71) Applicant: Dana Belgium N.V., Bruges (BE)

(72) Inventors: Kurt Cattoor, Koolkerke (BE); Filip Schacht, Meulebeke (BE); Filip Van Raepenbusch, Sint-Andries (BE)

(73) Assignee: DANA BELGIUM N.V., Bruges (BE)

( * ) Notice: Subject to any disclaimer, the term of this patent is extended or adjusted under 35 U.S.C. 154(b) by 235 days.

(21) Appl. No.: 17/651,395

(22) Filed: Feb. 16, 2022

(65) Prior Publication Data

US 2022/0258601 A1 Aug. 18, 2022

(30) Foreign Application Priority Data

Feb. 17, 2021 (DE) .................. 20 2021 100 765.6

(51) Int. Cl.
| | |
|---|---|
| F16H 3/085 | (2006.01) |
| B60K 17/08 | (2006.01) |
| F16H 3/091 | (2006.01) |

(52) U.S. Cl.
CPC .............. B60K 17/08 (2013.01); F16H 3/085 (2013.01); F16H 3/091 (2013.01); *F16H 2200/0043* (2013.01); *F16H 2200/0052* (2013.01); *F16H 2200/006* (2013.01); *F16H 2200/0095* (2013.01)

(58) Field of Classification Search
CPC ......... B60K 17/08; F16H 3/085; F16H 3/091; F16H 2200/0043; F16H 2200/0052; F16H 2200/006; F16H 2200/0095
USPC ...................................................... 74/665 G
See application file for complete search history.

(56) References Cited

U.S. PATENT DOCUMENTS

| | | | | |
|---|---|---|---|---|
| 4,392,391 | A * | 7/1983 | Jameson | F16H 3/093 74/331 |
| 4,584,891 | A * | 4/1986 | Mori | F16H 3/093 74/331 |
| 5,249,475 | A * | 10/1993 | McAskill | F16H 37/043 74/331 |
| 6,065,817 | A * | 5/2000 | Menke | B60T 10/02 303/3 |
| 6,336,518 | B1 * | 1/2002 | Matsuyama | F16H 61/46 180/306 |
| 6,513,399 | B2 * | 2/2003 | Lamela | F16H 3/093 74/331 |
| 6,988,426 | B2 * | 1/2006 | Calvert | F16H 3/093 74/331 |
| 7,454,991 | B2 * | 11/2008 | Buck | F16H 37/046 74/331 |
| 8,522,634 | B2 * | 9/2013 | Bridges | B60K 6/547 74/331 |
| 9,377,094 | B2 * | 6/2016 | Borntrager | B60T 10/02 |
| 10,428,905 | B2 * | 10/2019 | Regenscheit | F16H 3/093 |

* cited by examiner

*Primary Examiner* — Ha Dinh Ho
(74) *Attorney, Agent, or Firm* — McCoy Russell LLP (57) ABSTRACT

The present document relates to a transmission assembly with multiple gear ratios, comprising: a range gearbox having at least two selectable range gear ratios and comprising a first shaft, a low/high speed mode selection unit for selecting a low-speed mode or a high-speed mode and comprising a third shaft and a first output shaft, wherein the range gearbox and the low/high speed mode selection unit being sequentially disposed in a downstream direction of a transmission power flow, and wherein the first shaft, the third shaft and the first output shaft are offset from one another.

14 Claims, 6 Drawing Sheets

TRANSMISSION ASSEMBLY

CROSS-REFERENCE TO RELATED APPLICATION

The present application claims priority to German Utility Model Application No. 20 2021 100 765.6, entitled "TRANSMISSION ASSEMBLY", and filed on Feb. 17, 2021. The entire contents of the above-listed application is hereby incorporated by reference for all purposes.

TECHNICAL FIELD

The present disclosure relates to a transmission assembly with multiple forward and reverse gear ratios.

BACKGROUND AND SUMMARY

In motor vehicle construction, there is demand for transmissions with an inline concept, such as for transmissions with a 400-600 kW gearbox. In transmissions with an inline concept the input and output shaft are axially aligned or have a short drop. The known transmissions with an inline concept use planetary gear systems. These transmissions typically have a lower number of gears which affects comfort in gear shifting, transmission life and efficiency. Moreover, this kind of transmissions is difficult to maintain or repair.

An object of the present disclosure is to overcome the above mentioned problems of the state of the art and to provide a transmission assembly with an inline concept that is easy to install, repair and maintain and that provides a high degree of driving comfort, good controllability and longevity.

A transmission assembly having one or more of these capabilities is defined in claim 1. Special embodiments are described in the dependent claims.

In an embodiment, a transmission assembly with multiple gear ratios comprises a range gearbox having at least two selectable range gear ratios. The transmission assembly further comprises a low/high speed mode selection unit for selecting a low-speed mode or a high-speed mode and comprising a third shaft and a first output shaft. The range gearbox and the low/high speed mode selection unit are sequentially disposed in a downstream direction of a transmission power flow, and the first shaft, the third shaft and the first output shaft are offset from one another.

The transmission assembly may include different units that are arranged such that all clutches are disposed in a central part of the transmission assembly. Furthermore, the transmission assembly may have a countershaft layout that has a plurality of shafts which are offset from one another, so that the above mentioned units may be arranged in various positions, for example. Moreover, additional units may be added easily and variably connected to the transmission assembly in various positions. For instance, the transmission assembly or the individual units may be turned in different positions to allow for various drops depending on the various applications. The transmission may be executed with short drop, either as horizontal offset, vertical offset or a combination of both. Moreover, typically only a small installation space is needed and direct engine mount or remote engine mount may be offered. The presently disclosed transmission assembly can typically be maintained and repaired at low cost. Also, the range gearbox may include a plurality of gears which may increase driving comfort through smooth gear shifting.

In an embodiment, the transmission assembly may comprise a forward/reverse mode selection unit for selecting a forward mode or a reverse mode, wherein the forward/reverse mode selection unit is disposed upstream of the range gearbox relative to the direction of the transmission power flow and comprises an input shaft which is offset relative to the first shaft, the third shaft and the first output shaft.

In an embodiment, the range gearbox may have four selectable range gear ratios.

In an embodiment, the transmission ratios may be symmetrical with respect to forward and reverse gears.

In an embodiment, the transmission assembly may comprise four forward gear ratios and four reverse gear ratios or eight forward gear ratios and eight reverse gear ratios. As a further option, some of the forward or some of the reverse gears may be deselected to create more gears in forward driving than in reverse driving or vice versa, respectively.

In an embodiment, the forward/reverse mode selection unit may further comprise an idler shaft, a forward mode clutch and a reverse mode clutch, the idler shaft being drivingly connectable with the range gear box and configured to reverse a drive direction, the forward mode clutch being adapted to drivingly connect the input shaft with the range gearbox, and the reverse mode clutch being adapted to drivingly connect the input shaft with the idler shaft.

In an embodiment, the first shaft may be drivingly connectable to the forward/reverse mode selection unit and the low/high speed mode selection unit and may comprise a first range gear, a third range gear, a first range clutch and a third range clutch, the first range clutch being adapted to engage with and disengage from the first range gear, and the third range clutch being adapted to engage with or disengage from the third range gear.

In an embodiment, the range gearbox may comprise a second shaft that is drivingly connectable with the forward/reverse mode selection unit and the low/high speed mode selection unit and that comprises a second range gear, a fourth range gear, a second range clutch and a fourth range clutch, the second range clutch being adapted to engage with and disengage from the second range gear, and the fourth range clutch being adapted to engage with or disengage from the fourth range gear.

In an embodiment, the low/high speed mode selection unit may comprise a low-speed clutch and a high-speed clutch, wherein in the low-speed mode the low speed clutch is configured to drivingly connect the range gear box with the first output shaft via a low gear ratio, and in the high speed mode the high-speed clutch is configured to drivingly connect the range gear box with the second output shaft via a high gear ratio.

In an embodiment, the transmission assembly may further comprise a drop gearbox, the drop gearbox being arranged downstream of the low/high speed mode selection unit, wherein the drop gearbox comprises a second output shaft such that a radial and/or axial distance between the input shaft or the first shaft and the second output shaft is minimized or such that the input shaft or the first shaft and the second output shaft are axially aligned. Through an additional drop gearbox the offset between input and output shaft may be variably adjustable. Moreover, the transmission assembly may also be configured with zero offset between input shaft and output shaft, i.e. with in-line input and output shaft. Furthermore, using an additional drop box the drive direction may be changed in case of need.

In an embodiment, the first output shaft may be a front output, the second output shaft may be a rear output, or the second output shaft may comprise a front and rear output, wherein the drop gear box may further comprise multiple disconnect systems or an inter-axle differential with an optional locking. Including front and rear output through the additional drop gearbox, the transmission assembly may be configured for all-wheel drive vehicles.

In an embodiment, the drop gearbox may include an emergency steering pump drive.

In an embodiment, the transmission assembly may comprise a converter which is disposed on an upstream side of the input shaft with respect to the transmission power flow direction.

In an embodiment, the transmission assembly may further comprise a retarder, such as for speed control during downhill driving. The retarder may be disposed on an upstream side of the converter with respect to the transmission power flow direction. An input retarder may allow selection of an appropriate gear in order to optimize breaking performance of the transmission assembly.

In an embodiment, the converter may be further connected to a power take off and/or a charge pump.

In an embodiment, the forward/reverse modes may be interchangeable.

In an embodiment, a lubrication of the transmission assembly may be based on wet or dry sump technology in order to limit installation space. Furthermore, the transmission assembly may be configured such that it is directly connectable to a bell housing of an engine or is remotely driveable by means of an input driveshaft.

The presently disclosed transmission assembly differs from known assemblies by the setup/sequence of its main components. As describes above, the countershaft design powershift transmission assembly according to the present disclosure comprises a number of shafts, gears, clutches and bearings. These components may be positioned in such a way that eight different speeds become available as well in forward as in reverse driving direction in a restricted envelope. The layout of the gearbox is made in such a way that the shafts can be rotated around the different center distances to create different drops of transmission using the same components. The so called forward and reverse path can be used in different driving directions. In other words, it can be changed in the controller to drive the vehicle forward using the reverse path and the other way around. Thereby, the transmission assembly may be designed and construed such that the forward gear direction provides a high degree of efficiency. With this kind of layout, the transmission is very flexible to be used in different kinds of application independent of the axle rotation. Furthermore, if needed, one or more extra gear sets can be added at the output of the transmission to be able to have all types of drops and single or double output with or without disconnect or interaxle differential to serve even more applications or to easily change the total ratio in each gear. All the gears and clutches may be located in one part of the transmission rendering the transmission very compact for these high power flows. The present countershaft concept is unique for high power flows and restrictive envelope. The layout with high and low clutch may allow reducing the number of clutches while still providing up to eight speeds. Consequently, the transmission assembly can feature a high degree of compactness. Moreover, using high and low clutches may using only four range clutches. For example, there usually is only one double swap shift needed during shifting from F4 to F5 or from R4 to R5. Adding disconnect systems on the output flange and an ESPD (emergency steering pump drive) can be seen as extra options.

Embodiments of the transmission assembly according to the present disclosure are illustrated in the figures and described in the following detailed description. It is pointed out that the features of the embodiments disclosed herein may be realized in various other combinations. In the figures, equal or similar features are denoted by equal or similar reference signs.

DETAILED DESCRIPTION

Figure 1:
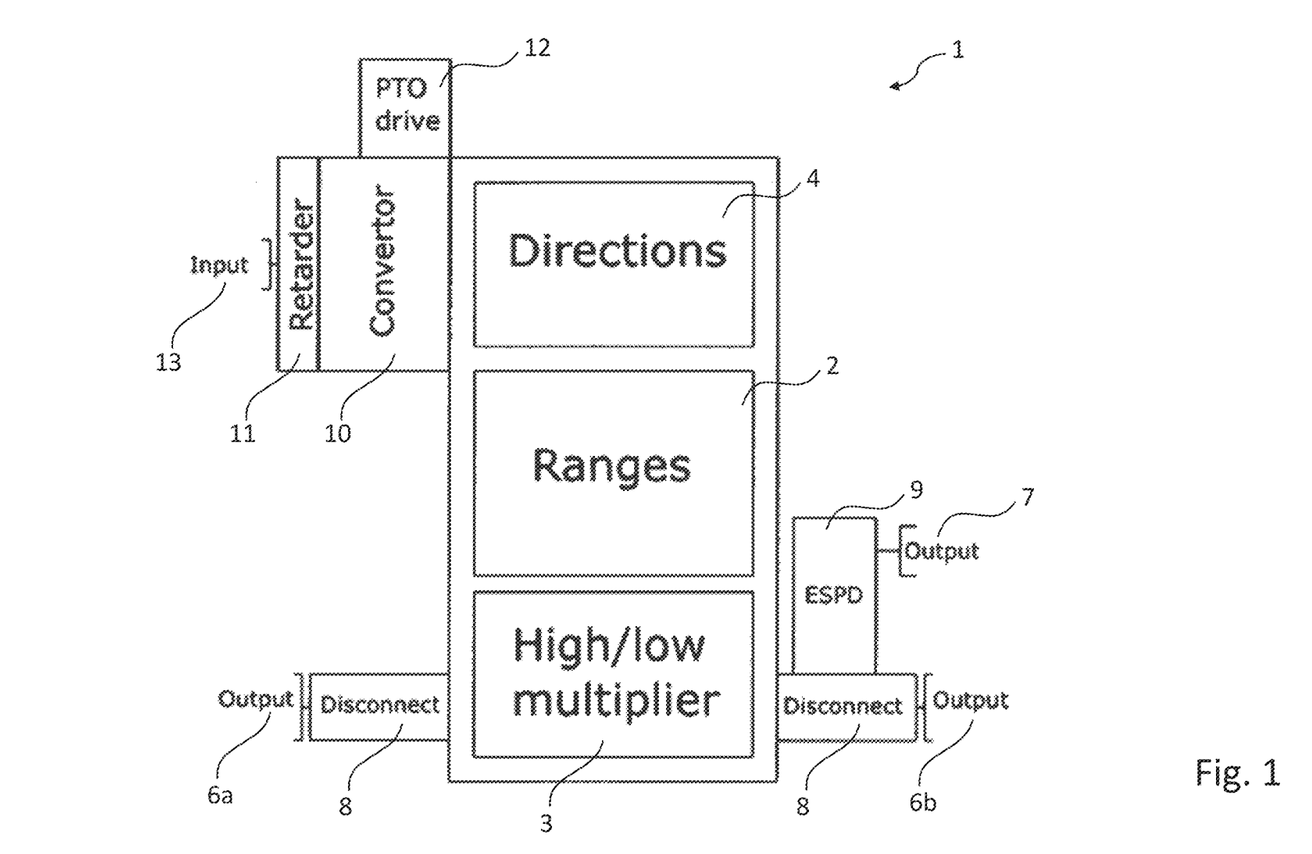
FIG. 1 shows a schematic overview of a layout of a transmission assembly according to a first embodiment.

FIG. 1 shows a schematic overview of a layout of a transmission assembly 1 according to a first embodiment. The transmission assembly 1 comprises a forward/reverse mode selection unit 4 for selecting a forward driving mode (shortly denoted as forward mode) and a reverse driving mode (shortly denoted as reverse mode). The transmission assembly 1 further comprises a range gearbox 2 having a plurality of selectable range gear ratios. Furthermore, the transmission assembly 1 comprises a low/high speed mode selection unit 3 for multiplying the range gear ratios of the range gearbox 2. The forward/reverse mode selection unit 4, the range gearbox 2 and the low/high speed mode selection unit 3 are sequentially disposed in a power flow direction of the transmission assembly 1, wherein the power flow direction is oriented from a transmission input 13 to a transmission output 6a, 6b, 7. On an upstream side of the forward/reverse mode selection unit 4 with respect to the power flow direction, the transmission assembly 1 comprises a converter 10. The converter 10 is connected to one or more power take-offs (shortly denoted as PTOs) on a downstream side of the converter 10. The transmission assembly 1 further comprises an input retarder (also shortly denoted as retarder) 11 between the transmission input 13 and the converter 10 on an upstream side of the converter 10 with respect to a transmission power flow direction. The low/high speed mode selection unit 3 is connected with the first and second transmission outputs 6a, 6b on a downstream side of the low/high speed mode selection unit 3. The first and second transmission outputs 6a, 6b may be connected to the front or rear wheels of a vehicle. Between the left wheel first transmission output 6a and the low/high speed mode selection unit 3 and between the right wheel first transmission output 6b and the low/high speed mode selection unit 3 a disconnect system 8a, 8b is provided to couple or decouple a first wheel axis supporting the left and right wheel connected to the left wheel first transmission output 6a and the right wheel first transmission output 6b, respectively, from a second wheel axis (not shown in this figure). Furthermore, the low/high speed mode selection unit 3 is further connected to a drop gearbox 5 having a third transmission output 7. The third transmission output 7 may be connected to a further power take-off. The drop gearbox 5 may comprise an emergency steering pump drive (ESPD) 9 as an example of a further power take-off that allows safe handling of the vehicle even if the power supply to the steering system fails.

Figure 2:
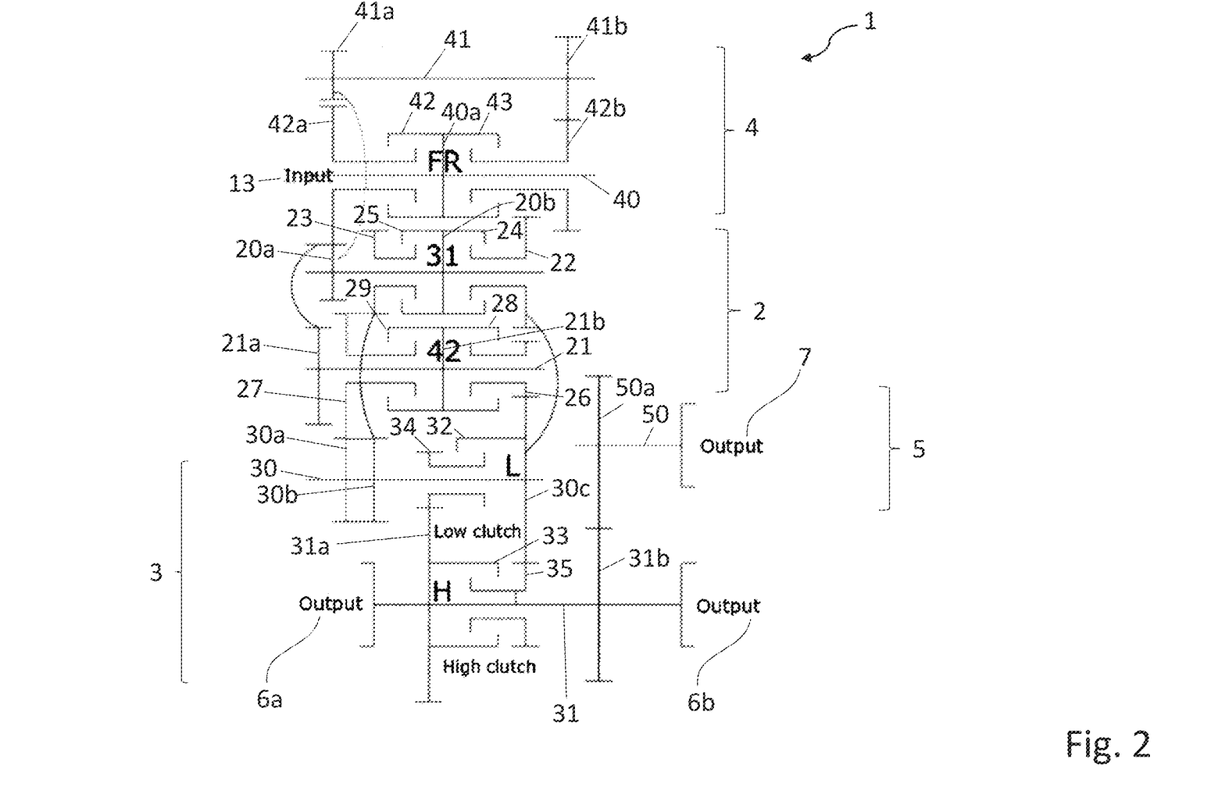
FIG. 2 shows a more detailed view of the individual units and their interactions within the transmission assembly according to a second embodiment.

FIG. 2 shows a more detailed view of the individual units and their interactions within a transmission assembly 1 according to a second embodiment. Similar as in FIG. 1, the transmission assembly 1 comprises a forward/reverse mode selection unit 4, a range gearbox 2, a low/high speed mode selection unit 3 and a drop gearbox 5. However, for simplicity, the optional retarder 11, converter 10, power take-off 12, disconnect system 8 and ESPD 9 shown in embodiment 1 of figure have been omitted in the second embodiment of FIG. 2, but nevertheless may also be added in FIG. 2. The transmission assembly according to the second embodiment comprises four range gear ratios which are doubled by the low/high speed selection unit.

The forward/reverse mode selection unit 4 comprises an input shaft 40 constituting a transmission input and being connectable to a motor of a vehicle on an upstream side with respect to a transmission power flow direction from the transmission input 13 to transmission outputs 6a, 6b and 7. The input shaft 40 comprises a fixed gear 40a that is rigidly connected with the input shaft 40. The forward/reverse mode selection unit 4 further comprises an idler shaft 41 for reversing a drive direction. The forward/reverse mode selection unit 4 further comprises a forward mode clutch 42, a forward gear 42a, a reverse mode clutch 43 and a reverse gear 42b. The forward mode clutch 42 is disposed between the forward gear 42a and the fixed gear 40a and configured to engage the forward gear 42a with the fixed gear 40a, and thus with the input shaft 40, and to disengage the forward gear 42a from the fixed gear 40a, and thus from the input shaft 40. The reverse mode clutch 43 is disposed between the reverse gear 42b and the fixed gear 40a and configured to engage the reverse gear 42b with the fixed gear 40a, and thus with the input shaft 40, and to disengage the reverse gear 42b from the fixed gear 40a, and thus from the input shaft 40. The idler shaft 41 further comprises a first fixed gear 41a and a second fixed gear 41b which are rigidly connected with the idler shaft 41. The input shaft 40 and the idler shaft 41 are disposed such that the forward gear 42a is in mesh with the first fixed gear 41a and the reverse gear 42b is in mesh with the second fixed gear 41b. Thus, if the forward mode clutch 42 engages the forward gear 42a with the input shaft 40, the rotary motion of the input shaft 41 is transferred to the forward gear, while no power is transferred to the idler shaft. Otherwise, if the reverse mode clutch 43 engages the reverse gear with the reverse gear 42b with the input shaft 40, rotary motion is transferred from the input shaft 40 to the idler shaft 41, and thus also to the first fixed gear 41a, via the reverse gear 42b and the second fixed gear 41b, and no power is transferred to the forward gear 42a. The first fixed gear 41a and the forward gear 42a are configured to rotate in opposite rotational directions.

The range gearbox 2 comprises a first shaft 20 and a second shaft 21. The first shaft 20 comprises a first fixed gear 20a and a second fixed gear 20b which are rigidly connected with the first shaft 20. The first shaft 20 further comprises a first range gear 22 and a first range clutch 24. The first range clutch 24 is disposed between the second fixed gear 20b and the first range gear 22 and configured to engage the first range gear 22 with the second fixed gear 20b, and thus with the first shaft 20, and to disengage the first range gear 22 from the second fixed gear 20b, and thus from the first shaft 20. The first shaft 20 further comprises a third range gear 23 and a third range clutch 25. The third range clutch 25 is disposed between the third range gear 23 and the second fixed gear 20b and configured to engage the third range gear 23 with the second fixed gear 20b, and thus with the first shaft 20, and to disengage the third range gear 23 from the second fixed gear 20b, and thus from the first shaft 20. The second shaft 21 comprises a first fixed gear 21a and a second fixed gear 21b which are rigidly connected to the second shaft 21. The second shaft 21 further comprises a second range gear 26 and a second range clutch 28. The second range clutch 28 is disposed between the second fixed gear 21b and the second range gear 26 and configured to engage the second range gear 26 with the second fixed gear 21b, and thus with the second shaft 20, and to disengage the second range gear 26 from the second fixed gear 21b, and thus from the second shaft 21. The second shaft 21 further comprises a fourth range gear 27 and a fourth range clutch 29. The fourth range clutch 29 is disposed between the fourth range gear 27 and the second fixed gear 21b and configured to engage the fourth range gear 27 with the second fixed gear 21b, and thus with the second shaft 21, and to disengage the fourth range gear 27 from the second fixed gear 21b, and thus from the second shaft 21.

The first fixed gear 20a of the first shaft 20 is in mesh with the first fixed gear 21a of the second shaft 21. Moreover, the first fixed gear 20a of the first shaft 20 is in mesh with the forward gear 42a and with the first fixed gear 41a of the idler shaft 41. The range gearbox 2 may be drivingly engaged with the forward/reverse mode selection unit 4 when engaging the forward clutch 42 or the reverse clutch 43. Engaging the forward clutch 42, the rotary motion of the input shaft 40 is transferred to first shaft 20 via the forward gear 42a and from there to the second shaft 21 via the first fixed gear 20a of the first shaft 20. Engaging the reverse clutch 43, the rotary motion of the input shaft 40 is transferred via the idler shaft 41 and the first fixed gear 41a to the first shaft 20 and from there to the second shaft 21 via the first fixed gear 20a.

The low/high speed mode selection unit 3 comprises a third shaft 30 and a first output shaft 31. The third shaft 30 comprises a first fixed gear 30a, a second fixed gear 30b and a third fixed gear 30c which are rigidly connected to the third shaft 30. The first fixed gear 30a of the third shaft 30 is in mesh with the third range gear 23. The second fixed gear 30b of the third shaft 30 is in mesh with the fourth range gear 27. The third fixed gear 30c of the third shaft 30 is in mesh with the first range gear 22 and the second range gear 26. The third shaft 30 further comprises a low gear 34 and a low clutch 32. The low clutch 32 is disposed between the low gear 34 and the third fixed gear 30c and configured to engage the low gear 34 with the third fixed gear 30c and to disengage the low gear 34 from the third fixed gear 30c. The first output shaft 31 comprises a first fixed gear 31a and a second fixed gear 31b which are rigidly connected to the first output shaft 31. Moreover the first output shaft 31 comprises a high gear 35 and a high clutch 33. The high clutch 33 is disposed between the first fixed gear 31a and the high gear 35 and configured to engage the high gear 35 with the first fixed gear 31a, and thus with the output shaft 31, and to disengage the high gear 35 from the first fixed gear 31a, and thus from the first output shaft 31. Furthermore, the first fixed gear 31a of the first output shaft 31 is in mesh with the low gear 34.

The low/high speed mode selection unit 3 may be drivingly engaged with the range gearbox 2 via the first, second, third or fourth range gear 22, 23, 26, 27 which transfer the rotary motion of the first or second shaft 20, 21 to the third shaft 30 via the first, second or third fixed gears 30a, 30b, 30c of the third shaft 30. The total number of gear ratios created by engaging the four range gears 22, 23, 26, 27 is doubled by the low/high speed mode selection unit 3. Engaging the low gear 34 via the low clutch 32, the rotary motion of the third shaft 30 is transferred to the first output shaft 31 via the low gear 34 reducing the respective range gear ratio that has been transferred to the third shaft 30 and creating an additional gear ratio. Engaging the high gear 35 via high clutch 33, the rotary motion of the third shaft 30 is transferred to the first output shaft 31 via the third fixed gear 30c of the third shaft 30, the high gear 35 and the first fixed gear 31a of the first output shaft 31 increasing the respective range gear ratio that has been transferred to the third shaft 30 and creating an additional gear ratio.

The first output shaft 31 comprises a left output 6a and a right output 6b to which left and right wheels of the vehicle may be connected. The rotary motion produced by the motor and input to the transmission input shaft 40 is thus transferred to the wheel via the first output shaft. Optionally, disconnect systems may be added at the downstream ends of the transmission assembly 1 as shown in FIG. 1.

The drop gearbox comprises a second output shaft 50 to which a fixed gear 50a is rigidly connected. The fixed gear 50a is in mesh with the second fixed gear 31b of the first output shaft 31. Moreover, the second output shaft 50 has a third output 7. The third output 7 may be connected to a power take-off.

As can be seen with reference to the second embodiment, the transmission assembly is characterized such as by its counter shaft design meaning that the transmission assembly includes a plurality of shafts having a vertical and/or horizontal off set enabling a variable arrangement of the various units. Furthermore, also zero vertical off set between transmission input and transmission output can be realized providing an alternative to transmissions with planetary gear systems.

Figure 3:
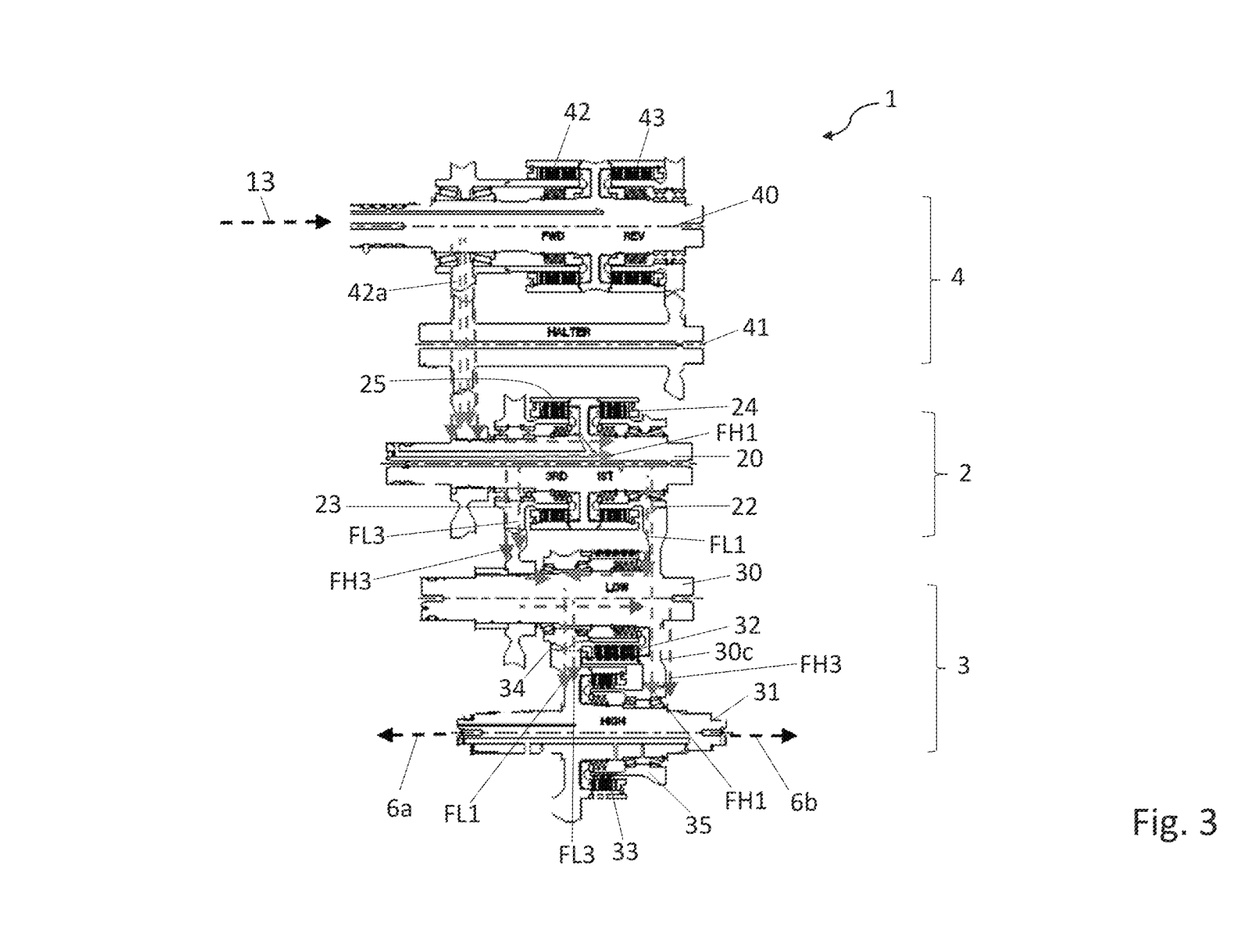
FIG. 3 shows a schematic view of a transmission assembly having four forward and four reverse gears according to a third embodiment together with power flows in the forward gears.

FIG. 3 shows a schematic view of a transmission assembly having four forward and four reverse gears according to a third embodiment together with respective power flows in the forward gears. The structure of the transmission assembly 1 according to embodiment three is similar to the structure of the transmission assembly 1 according to embodiment two. The transmission assembly 1 of FIG. 3 comprises a forward/reverse mode selection unit 4 with an input shaft 40 and an idler shaft 41, a range gearbox 2 with a first shaft 20 and a low/high mode selection unit 3 with a third shaft 30 and a first output shaft 31. In contrast to the second embodiment of FIG. 2, the third embodiment of the transmission assembly does not comprise a second shaft 21 with third and fourth range clutches 28, 29, since the total number of gear ratios of embodiment three per driving direction is four. Moreover, in FIG. 3, the drop gearbox 5 has been omitted, but may be also an optional feature here.

The power flows according to the four forward gear ratios are as follows. The rotary power 13 generated by the motor is input to the input shaft 40. Since the forward clutch 42 is closed, the idler shaft 41 is bypassed and the rotary power is transferred to the first shaft 20 via the forward gear 42a. The first gear ratio FL1 is created by closing the first range clutch 24 and the low clutch 32 such that the rotary power is transferred from the first shaft 20 to the third shaft 30 via the first range gear 22 and to the first output shaft 31 via the low gear 34. The second gear ratio FH1 is created by closing the first range clutch 24 and the high clutch 32 such that the rotary power is transferred from the first shaft 20 to the third shaft 30 via the first range gear 22 and to the first output shaft 31 via the third fixed gear 30c and the high gear 35. The third gear ratio FL3 is created by closing the third range clutch 25 and the low clutch 32 such that the rotary power is transferred from the first shaft 20 to the third shaft 30 via the third range gear 23 and to the first output shaft 31 via the low gear 34. The fourth gear ratio FH3 is created by closing the third range clutch 25 and the high clutch 33 such that the rotary power is transferred from the first shaft 20 to the third shaft 30 via the third range gear 23 and to the first output shaft 31 via the third fixed gear 30c of the third shaft 30 and the high gear 35. From the first output shaft 31, the rotary power is output to the first and second outputs 6a, 6b.

Figure 4:
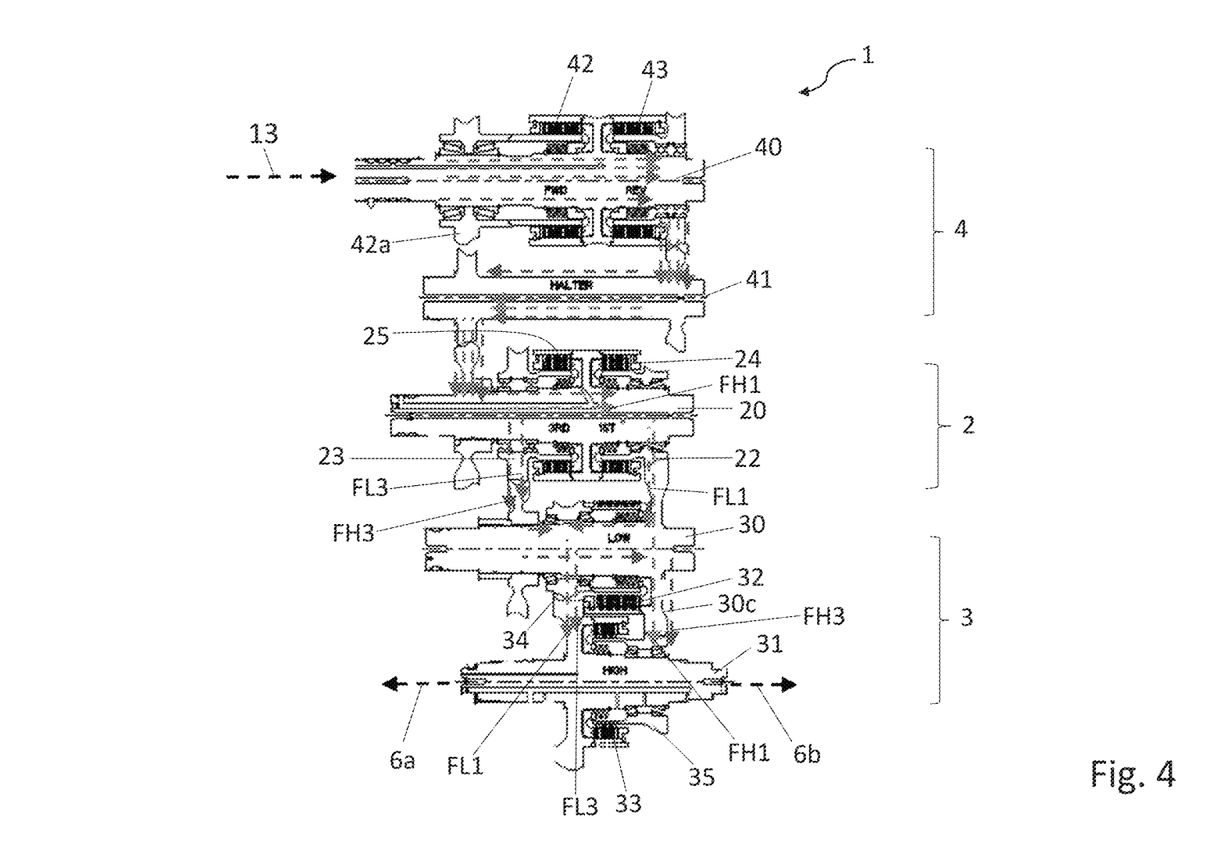
FIG. 4 shows a schematic view of the transmission assembly according to the third embodiment shown in FIG. 3 together with power flows in the reverse gears.

FIG. 4 shows a schematic view of the transmission assembly 1 according to the third embodiment shown in FIG. 3 together with respective power flows in the reverse gears. The power flows according to the four reverse gear ratios are as follows. The rotary power 13 generated by the motor is input to the input shaft 40. Since the reverse clutch 43 is closed (and the forward clutch 42 is open), the rotary power is transferred from the input shaft 40 to the idler shaft 41 via the reverse gear 42b. From the idler shaft 41, which reverses a rotary direction with respect to the input shaft 40, the rotary power is transferred to the first shaft 20 via the first fixed gear 41a of the idler shaft 41. The reverse gear ratios are obtained analogously to the forward direction. The first gear ratio RL1 is created by closing the first range clutch 24 and the low clutch 32 such that the rotary power is transferred from the first shaft 20 to the third shaft 30 via the first range gear 22 and to the first output shaft 31 via the low gear 34. The second gear ratio RH1 is created by closing the first range clutch 24 and the high clutch 32 such that the rotary power is transferred from the first shaft 20 to the third shaft 30 via the first range gear 22 and to the first output shaft 31 via the third fixed gear 30c and the high gear 35. The third gear ratio RL3 is created by closing the third range clutch 25 and the low clutch 32 such that the rotary power is transferred from the first shaft 20 to the third shaft 30 via the third range gear 23 and to the first output shaft 31 via the low gear 34. The fourth gear ratio RH3 is created by closing the third range clutch 25 and the high clutch 33 such that the rotary power is transferred from the first shaft 20 to the third shaft 30 via the third range gear 23 and to the first output shaft 31 via the third fixed gear 30c of the third shaft 30 and the high gear 35. From the first output shaft 31, the rotary power is output to the first and second outputs 6a, 6b.

Figure 5:
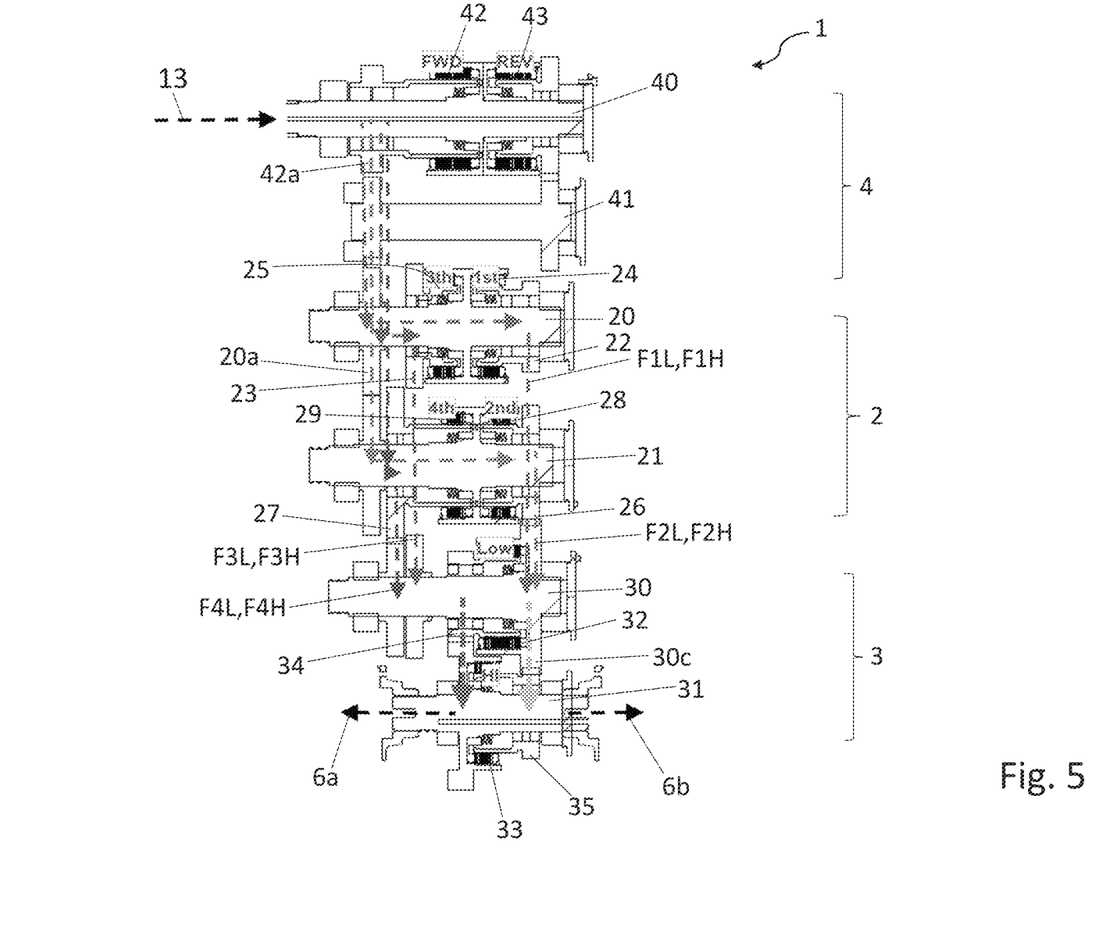
FIG. 5 shows a schematic view of a transmission assembly having eight forward and eight reverse gears according to a fourth embodiment together with power flows in the forward gears.

FIG. 5 shows a schematic view of a transmission assembly 1 having eight forward and eight reverse gears according to a fourth embodiment together with respective power flows in the forward gears. The forward/reverse mode selection unit 4 with the input shaft 40 and the idler shaft 41, the range gearbox 2 with the first shaft 20 and the second shaft 21 and the low/high speed mode selection unit 3 with the third shaft 30 and the first output shaft 31 are similarly structured as in the second embodiment.

The power flows according to the eight forward gear ratios are as follows. The rotary power 13 generated by the motor is input to the input shaft 40. Since the forward clutch 42 is closed, the idler shaft 41 is bypassed and the rotary power is transferred to the first shaft 20 via the forward gear 42a. The first gear ratio F1L is created by closing the first range clutch 24 and the low clutch 32 such that the rotary power is transferred from the first shaft 20 to the third shaft 30 via the first range gear 22 and to the first output shaft 31 via the low gear 34. The second gear ratio F2L is created by closing the second range clutch 28 and the low clutch 32 such that the rotary power is transferred from the first shaft 20 to the third shaft 30 via the first fixed gear 20a of the first shaft and the second range gear 26 and to the first output shaft 31 via the low gear 34. The third gear ratio F3L is created by closing the third range clutch 25 and the low clutch 32 such that the rotary power is transferred from the first shaft 20 to the third shaft 30 via the third range gear 23 and to the first output shaft 31 via the low gear 34. The fourth gear ratio F4L is created by closing the fourth range clutch 29 and the low clutch 32 such that the rotary power is transferred from the first shaft 20 to the third shaft 30 via the first fixed gear 20a of the first shaft 20 and the fourth range gear 27 and to the first output shaft 31 via the low gear 34. The fifth gear ratio F1H is created by closing the first range clutch 24 and the high clutch 33 such that the rotary power is transferred from the first shaft 20 to the third shaft 30 via the first range gear 22 and to the first output shaft 31 via the third fixed gear 30c of the third shaft 30 and the high gear 35. The sixth gear ratio F2H is created by closing the second range clutch 28 and the high clutch 33 such that the rotary power is transferred from the first shaft 20 to the third shaft 30 via the first fixed gear 20a of the first shaft 20 and the second range gear 26 and to the first output shaft 31 via the third fixed gear 30c of the third shaft 30 and the high gear 35. The seventh gear ratio F3H is created by closing the third range clutch 25 and the high clutch 33 such that the rotary power is transferred from the first shaft 20 to the third shaft 30 via the third range gear 23 and to the first output shaft 31 via the third fixed gear 30c of the third shaft 30 and the high gear 35. The eighth gear ratio F4H is created by closing the fourth range clutch 29 and the high clutch 33 such that the rotary power is transferred from the first shaft 20 to the third shaft 30 via the first fixed gear 20a of the first shaft 20 and the fourth range gear 27 and to the first output shaft 31 via the third fixed gear 30c of the third shaft 30 and the high gear 35. From the first output shaft 31, the rotary power is output to the first and second outputs 6a, 6b.

Figure 6:
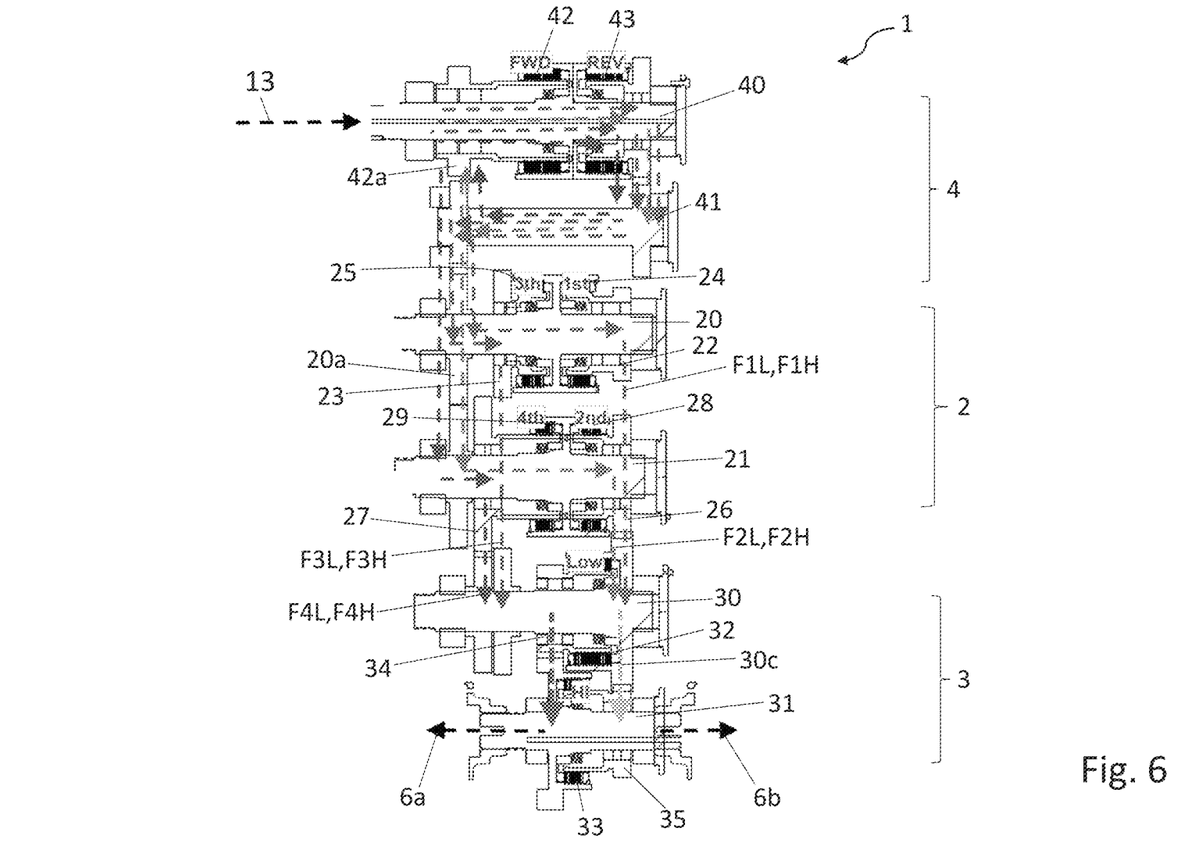
FIG. 6 shows a schematic view of the transmission assembly according to the fourth embodiment shown in FIG. 5 together with power flows in the reverse gears.

FIG. 6 shows a schematic view of the transmission assembly according to the fourth embodiment shown in FIG. 5 together with respective power flows in the reverse gears. The power flows according to the eight reverse gear ratios is as follows. The rotary power 13 generated by the motor is input to the input shaft 40. Since the reverse clutch 43 is closed (and the forward clutch 42 is open), the rotary power is transferred from the input shaft 40 to the idler shaft 41 via the reverse gear 42b. From the idler shaft 41, which reverses a rotary direction with respect to the input shaft 40, the rotary power is transferred to the first shaft 20 via the first fixed gear 41a of the idler shaft 41. The reverse gear ratios are obtained analogously to the forward direction. The first gear ratio R1L is created by closing the first range clutch 24 and the low clutch 32 such that the rotary power is transferred from the first shaft 20 to the third shaft 30 via the first range gear 22 and to the first output shaft 31 via the low gear 34. The second gear ratio R2L is created by closing the second range clutch 28 and the low clutch 32 such that the rotary power is transferred from the first shaft 20 to the third shaft 30 via the first fixed gear 20a of the first shaft 20 and the second range gear 26 and to the first output shaft 31 via the low gear 34. The third gear ratio R3L is created by closing the third range clutch 25 and the low clutch 32 such that the rotary power is transferred from the first shaft 20 to the third shaft 30 via the third range gear 23 and to the first output shaft 31 via the low gear 34. The fourth gear ratio R4L is created by closing the fourth range clutch 29 and the low clutch 32 such that the rotary power is transferred from the first shaft 20 to the third shaft 30 via the first fixed gear 20a of the first shaft 20 and the fourth range gear 27 and to the first output shaft 31 via the low gear 34. The fifth gear ratio F1H is created by closing the first range clutch 24 and the high clutch 33 such that the rotary power is transferred from the first shaft 20 to the third shaft 30 via the first range gear 22 and to the first output shaft 31 via the third fixed gear 30c of the third shaft 30 and the high gear 35. The sixth gear ratio F2H is created by closing the second range clutch 28 and the high clutch 33 such that the rotary power is transferred from the first shaft 20 to the third shaft 30 via the first fixed gear 20a of the first shaft 20 and the second range gear 26 and to the first output shaft 31 via the third fixed gear 30c of the third shaft 30 and the high gear 35. The seventh gear ratio F3H is created by closing the third range clutch 25 and the high clutch 33 such that the rotary power is transferred from the first shaft 20 to the third shaft 30 via the third range gear 23 and to the first output shaft 31 via the third fixed gear 30c of the third shaft 30 and the high gear 35. The eighth gear ratio F4H is created by closing the fourth range clutch 29 and the high clutch 33 such that the rotary power is transferred from the first shaft 20 to the third shaft 30 via the first fixed gear 20a of the first shaft 20 and the fourth range gear 27 and to the first output shaft 31 via the third fixed gear 30c of the third shaft 30 and the high gear 35. From the first output shaft 31, the rotary power is output to the first and second outputs 6a, 6b.

The invention claimed is:

1. Transmission assembly with multiple gear ratios, comprising:
   a range gearbox having at least two selectable range gear ratios and comprising a first shaft,
   a low/high speed mode selection unit for selecting a low-speed mode or a high-speed mode and comprising a third shaft and a first output shaft,
   a converter which is disposed on an upstream side of an input shaft or the first shaft with respect to the transmission power flow direction, and
   a retarder for speed control during downhill driving, which is disposed on an upstream side of the converter with respect to the transmission power flow direction, wherein
   the range gearbox and the low/high speed mode selection unit being sequentially disposed in a downstream direction of a transmission power flow, and wherein
   the first shaft, the third shaft and the first output shaft are offset from one another.

2. The transmission assembly according to claim 1, further comprising a forward/reverse mode selection unit for selecting a forward mode or a reverse mode, wherein the forward/reverse mode selection unit is disposed upstream of the range gearbox relative to the direction of the transmission power flow and, the input shaft is offset relative to the first shaft, the third shaft and the first output shaft.

3. The transmission assembly according to claim 1, wherein the range gearbox has four selectable range gear ratios.

4. The transmission assembly according to claim 2, wherein the transmission ratios are symmetrical with respect to forward and reverse gears.

5. The transmission assembly according to claim 1, comprising four forward gear ratios and four reverse gear ratios, six forward gear ratios and six reverse gear ratios, or eight forward gear ratios and eight reverse gear ratios.

6. The transmission assembly according to claim 2, wherein the forward/reverse mode selection unit further comprises an idler shaft, a forward mode clutch and a reverse mode clutch, the idler shaft being drivingly connectable with the range gearbox and configured to reverse a drive direction, the forward mode clutch being adapted to drivingly connect the input shaft with the range gearbox, and the reverse mode clutch being adapted to drivingly connect the input shaft with the idler shaft.

7. The transmission assembly according to claim 2, wherein the first shaft is drivingly connectable to the forward/reverse mode selection unit and the low/high speed mode selection unit and comprises a first range gear, a third range gear, a first range clutch and a third range clutch, the first range clutch being adapted to engage with and disengage from the first range gear, and the third range clutch being adapted to engage with or disengage from the third range gear.

8. The transmission assembly according to claim 2, wherein the range gearbox further comprises a second shaft that is drivingly connectable with the forward/reverse mode selection unit and the low/high speed mode selection unit and comprises a second range gear, a fourth range gear, a second range clutch and a fourth range clutch, the second range clutch being adapted to engage with and disengage from the second range gear, and the fourth range clutch being adapted to engage with and disengage from the fourth range gear.

9. The transmission assembly according to claim 1, wherein the low/high speed mode selection unit further comprises a low-speed clutch and a high-speed clutch, wherein in the low-speed mode the low speed clutch is configured to drivingly connect the range gear box with the first output shaft via a low gear ratio, and in the high speed mode the high-speed clutch is configured to drivingly connect the range gear box with the first output shaft via a high gear ratio.

10. The transmission assembly according to claim 1, further comprising a drop gearbox being arranged downstream of the low/high speed mode selection unit and comprising a second output shaft such that a radial and/or axial distance between the input shaft or the first shaft and the second output shaft is minimized or such that the input shaft or the first shaft and the second output shaft are axially aligned.

11. The transmission assembly according to claim 10, wherein the first output shaft is a front output, the second output shaft is a rear output, or wherein the second output shaft comprises a front and rear output, wherein the drop gearbox further comprises multiple disconnect systems or an inter-axle differential with an optional locking.

12. The transmission assembly according to claim 10, wherein the drop gearbox includes an emergency steering pump drive.

13. The transmission assembly according to claim 1, wherein the converter is further connected to a power take off or a charge pump.

14. The transmission assembly according to claim 2, wherein the forward/reverse modes are interchangeable.

* * * * *